US009817599B2

(12) United States Patent
Nazari et al.

(10) Patent No.: US 9,817,599 B2
(45) Date of Patent: Nov. 14, 2017

(54) STORING INDICATORS OF UNREFERENCED MEMORY ADDRESSES IN VOLATILE MEMORY

(71) Applicant: Hewlett Packard Enterprise Development LP, Houston, TX (US)

(72) Inventors: Siamak Nazari, Fremont, CA (US); Jin Wang, Fremont, CA (US); Srinivasa D Murthy, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 347 days.

(21) Appl. No.: 14/709,132

(22) Filed: May 11, 2015

(65) Prior Publication Data
US 2016/0335022 A1 Nov. 17, 2016

(51) Int. Cl.
G06F 12/00 (2006.01)
G06F 3/06 (2006.01)
G06F 11/20 (2006.01)

(52) U.S. Cl.
CPC .......... G06F 3/0631 (2013.01); G06F 3/0608 (2013.01); G06F 3/0665 (2013.01); G06F 3/0685 (2013.01); G06F 11/2071 (2013.01); G06F 11/2074 (2013.01); G06F 11/2076 (2013.01); G06F 11/2079 (2013.01)

(58) Field of Classification Search
CPC G06F 11/2071–11/2079; G06F 3/0631; G06F 3/0604; G06F 3/0673; G06F 3/0653; G06F 3/0644; G06F 3/0608; G06F 3/0665; G06F 3/0685
See application file for complete search history.

(56) References Cited

U.S. PATENT DOCUMENTS

| 8,074,043 | B1 | 12/2011 | Zeis |
| 8,332,612 | B1 | 12/2012 | Raizen et al. |
| 2011/0145207 | A1 | 6/2011 | Agrawal et al. |
| 2012/0166403 | A1 | 6/2012 | Kim et al. |
| 2014/0244599 | A1 | 8/2014 | Zhang et al. |
| 2014/0337664 | A1 | 11/2014 | Gokhale et al. |
| 2014/0351214 | A1 | 11/2014 | Abercrombie et al. |

OTHER PUBLICATIONS

Mao, B. et al., POD: Performance Oriented I/O Deduplication for Primary Storage Systems in the Cloud, (Research Paper), May 19-23, 2014, 10 pps. http://ieeexplore.ieee.org/stamp/stamp.jsp?arnumber=6877308.

*Primary Examiner* — Reginald Bragdon
*Assistant Examiner* — Hannah A Faye-Joyner
(74) *Attorney, Agent, or Firm* — Hewlett Packard Enterprise Development Patent Department

(57) ABSTRACT

In example implementations, unreferenced memory addresses in a segment of a storage volume may be identified. Access to the segment of the storage volume may be controlled by one of a plurality of storage volume controllers (SVCs). The plurality of SVCs may control access to respective segments of the storage volume. Indicators of the identified unreferenced memory addresses may be stored in a volatile memory in the one of the plurality of SVCs. In response to an input/output (I/O) command from a host, data may be written to one of the identified unreferenced memory addresses corresponding to one of the indicators stored in the volatile memory. After the data has been written, the one of the indicators may be deleted from the volatile memory. The one of the identified unreferenced memory addresses may not have been made available to other SVCs after being identified.

15 Claims, 8 Drawing Sheets

STORING INDICATORS OF UNREFERENCED MEMORY ADDRESSES IN VOLATILE MEMORY

BACKGROUND

In data storage systems, multiple copies of the same data may be stored in multiple locations. For example, in an electronic mail (e-mail) system, there may be ten instances of the same two-megabyte (MB) file attachment, which may result in twenty MB of memory space being used when the e-mail platform is backed up. To decrease the amount of memory space utilization, a data deduplication process may be used to identify multiple instances of the same data and store just one instance of such data, replacing the other instances with a reference that points to the stored instance. Thus, in the e-mail example above, one instance of the file attachment may be stored rather than ten instances, reducing the utilized memory space by about ten times.

BRIEF DESCRIPTION OF THE DRAWINGS

The following detailed description references the drawings, wherein.

DETAILED DESCRIPTION

When data deduplication occurs in a storage system, memory addresses previously used to store duplicate copies of data may no longer be used. Such memory addresses may then be used to store other data, but metadata may need to be updated to indicate that the memory addresses are available, and/or transactional logs may need to be update to indicate that metadata needs to be updated. Such updating of metadata/transactional logs may be time- and resource-intensive since the metadata and transactional logs may be stored in non-volatile memory. In storage systems that use data deduplication, memory addresses that store duplicate copies of data are periodically released as the deduplication process occurs, so there is a lot of churn in the usage of memory addresses. However, the updating of metadata/transactional logs may occur too slowly for the system to use the released addresses before new unused memory space in a storage system is used to meet incoming requests to store data. In light of the above, the present disclosure provides for tracking released memory addresses in volatile memory, allowing released memory addresses to be reused without incurring high processing costs, and enabling conservation of new unused memory space.

Figure 1:
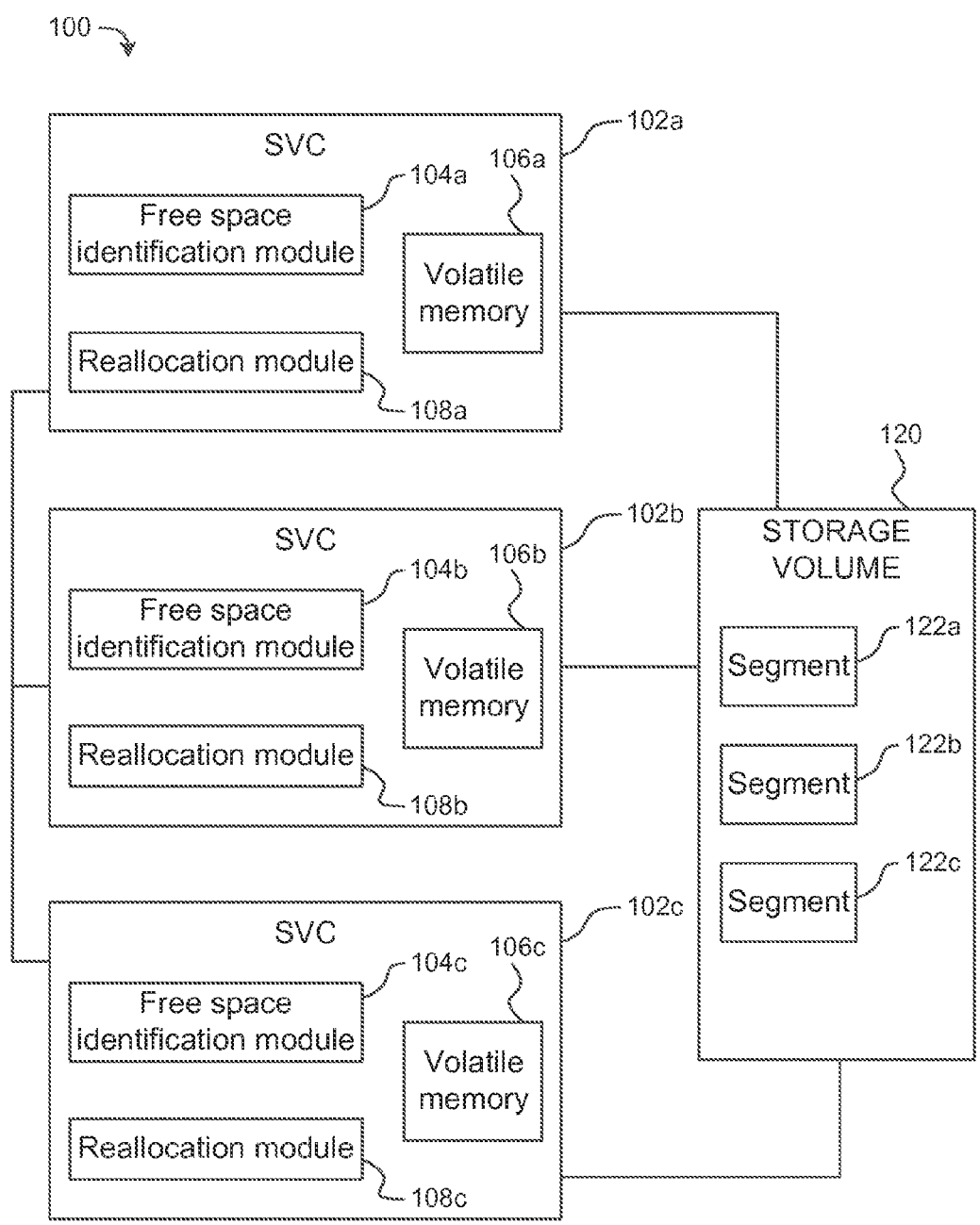
FIG. 1 is a block diagram of an example system for storing indicators of unreferenced memory addresses in volatile memory.

Referring now to the drawings, FIG. 1 is a block diagram of an example system 100 for storing indicators of unreferenced memory addresses in volatile memory. In some implementations, system 100 may operate as and/or be part of a server. In FIG. 1, system 100 includes storage volume 120 communicatively coupled to storage volume controllers (SVCs) 102a, 102b, and 102c. As used herein, the terms "include", "have", and "comprise" are interchangeable and should be understood to have the same meaning. SVCs 102a, 102b, and 102c may be communicatively coupled to one another. In some implementations, SVCs 102a, 102b, and 102c may be communicatively coupled to one another and to storage volume 120 via a dedicated network, such as Fibre Channel cables or an Internet Small Computer System Interface (iSCSI) network. As used herein, the term "storage volume" should be understood to refer to an area of storage capacity in a computer system. A storage volume may include physical storage devices (e.g., hard disk drive (HDD), solid-state drive (SSD), tape drive) and/or logical storage devices (e.g., a virtual disk). As used herein, the term "storage volume controller" (SVC) should be understood to refer to a device that controls access to a storage volume. For example, an SVC may receive requests from hosts to read data from and write data to locations in a storage volume, and may schedule execution of such read and write operations.

Each of SVCs 102a, 102b, and 102c may control access to a respective segment of storage volume 120. For example, SVC 102a may control access to segment 122a of storage volume 120, SVC 102b may control access to segment 122b of storage volume 120, and SVC 102c may control access to segment 122c of storage volume 120. An Input/Output (I/O) command from a host may be received by any of SVCs 102a-c, and the SVC that receives the I/O command may execute the command on the segment of storage volume 120 corresponding to that SVC, or transfer the command to another SVC if the command is directed at a different segment of storage volume 120. As used herein, the term "I/O command" should be understood to refer to a command associated with data to be transferred to or from a storage volume. For example, an I/O command may be a command to read data from a storage volume, or a command to write data to a storage volume. The combined storage capacity of segments 122a-c may be less than the total storage capacity of storage volume 120. Storage capacity, in a storage volume, that has not been allocated/assigned to any SVC may be referred to herein as "free space" or "global free space" of the storage volume.

Although segments 122a, 122b, and 122c are shown to be the same size in FIG. 1, it should be understood that segments corresponding to different SVCs may vary in size (i.e., memory capacity), and that any segment may grow and/or shrink in size during runtime operation of system 100. For example, some free space of storage volume 120 may be allocated to SVC 102a upon request (e.g., if SVC 102a has received or is expected to receive many write commands from hosts), increasing the size of segment 122a, or SVC 102b may release control over some of segment 122b to add to free space of storage volume 120 (e.g., if SVC 102b has received or is expected to receive few write commands from hosts), decreasing the size of segment 122b. Although three SVCs are shown in FIG. 1, it should be understood that system 100 may include additional SVCs or fewer SVCs (and additional or fewer corresponding segments of storage volume 120), and that the concepts discussed herein may apply to systems with any number of SVCs.

Each of SVCs 102a, 102b, and 102c may include a free space identification module 104a, 104b, and 104c, respectively; a volatile memory 106a, 106b, and 106c, respectively; and a reallocation module 108a, 108b, and 108c, respectively. A module may include a set of instructions encoded on a machine-readable storage medium and executable by a processor. In addition or as an alternative, a module may include a hardware device comprising electronic circuitry for implementing the functionality described below.

Each of free space identification modules 104a, 104b, and 104c may identify unreferenced memory addresses in the respective segment of storage volume 120. For example, free space identification module 104a may identify unreferenced memory addresses in segment 122a, free space identification module 104b may identify unreferenced memory addresses in segment 122b, and free space identification module 104c may identify unreferenced memory addresses in segment 122c. As used herein, the term "unreferenced memory address" should be understood to refer to a memory address, used to store a duplicate copy of data, that is not used to store a link/reference pointer that replaces the duplicate copy of data during the process of data deduplication.

Each of volatile memories 106a, 106b, and 106c may store indicators of unreferenced memory addresses identified by the respective free space identification module. For example, volatile memory 106a may store indicators of unreferenced memory addresses in segment 122a that are identified by free space identification module 104a, volatile memory 106b may store indicators of unreferenced memory addresses in segment 122b that are identified by free space identification module 104b, and volatile memory 106c may store indicators of unreferenced memory addresses in segment 122c that are identified by free space identification module 104c. Volatile memories 106a-c may include, for example, a random-access memory (RAM). In some implementations, volatile memories 106a-c may store physical and/or virtual addresses, or fragments of such addresses, corresponding to unreferenced memory addresses. In some implementations, volatile memories 106a-c may store pointers to unreferenced memory addresses. The use of a volatile memory for storing indicators of unreferenced memory addresses allows SVCs 102a-c to locally track which memory addresses have been unreferenced (i.e., freed due to deduplication). The faster access time for a volatile memory versus a non-volatile memory (where metadata/transaction logs are stored that indicate which memory addresses have been affected by deduplication) allows unreferenced memory addresses to be reused by the respective SVC much more quickly, reducing the amount of global free space requested by the SVC.

A reallocation module (e.g., reallocation modules 108a, 108b, and 108c) may write, in response to an I/O command from a host, data to one of the identified unreferenced memory addresses corresponding to one of the indicators stored in the respective volatile memory. For example, reallocation module 108a may write data to an address corresponding to one of the indicators stored in volatile memory 106a, reallocation module 108b may write data to an address corresponding to one of the indicators stored in volatile memory 106b, and reallocation module 108c may write data to an address corresponding to one of the indicators stored in volatile memory 106c.

A reallocation module (e.g., reallocation modules 108a, 108b, and 108c) may delete, after the data has been written, the one of the indicators from the respective volatile memory. For example, reallocation module 108a may delete the corresponding indicator from volatile memory 106a, reallocation module 108b may delete the corresponding indicator from volatile memory 106b, and reallocation module 108c may delete the corresponding indicator from volatile memory 106c. The one of the identified unreferenced memory addresses may not have been made available to other SVCs after being identified. For example, if free space identification module 104a identifies an unreferenced memory address in segment 122a and stores an indicator of such an address in volatile memory 106a, reallocation module 108a may write to the address in response to an I/O command received by SVC 102a and delete, from volatile memory 106a, the indicator corresponding to the address without the address ever being made available to SVCs 102b and 102c after free space identification module 104a identified the address.

Figure 2:
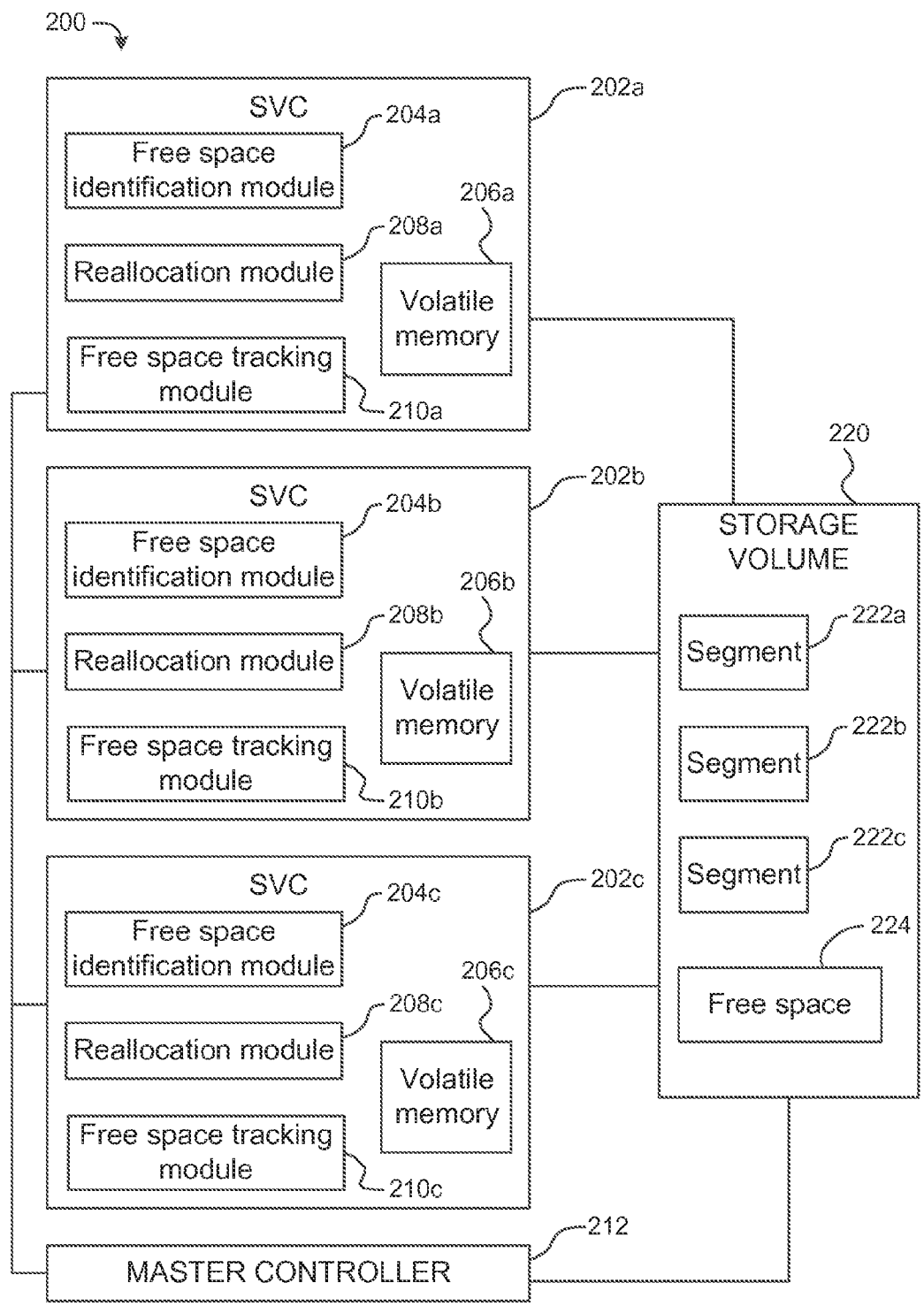
FIG. 2 is a block diagram of an example system having a plurality of storage volume controllers and a master controller.

FIG. 2 is a block diagram of an example system 200 having a plurality of storage volume controllers and a master controller. As used herein, the term "master controller" should be understood to refer to an entity that allocates free space of a storage volume to SVCs that control access to the storage volume. In some implementations, system 200 may operate as and/or be part of a server. In FIG. 2, system 200 includes storage volume 220 communicatively coupled to SVCs 202a, 202b, and 202c and master controller 212. SVCs 202a, 202b, and 202c may be communicatively coupled to one another and to master controller 212. In some implementations, storage volume 220, master controller 212, and SVCs 202a, 202b, and 202c may be communicatively coupled via a dedicated network, such as Fibre Channel cables or an iSCSI network.

Master controller 212 may allocate free space of storage volume 220 to respective ones of SVCs 202a, 202b, and 202c. For example, master controller 212 may allocate segment 222a of storage volume 220 to SVC 202a, segment 222b of storage volume 220 to SVC 202b, and segment 222c of storage volume 220 to SVC 202c. SVCs 202a-c may control access to segments 222a-c, respectively. Master controller 212 may allocate memory space to SVCs in system 200 based on, for example, each SVC's current and/or predicted workload, and/or the importance of the processes/applications supported by each SVC. Although segments 222a, 222b, and 222c are shown to be the same size in FIG. 2, it should be understood that segments corresponding to different SVCs may vary in size (i.e., memory capacity), and that any segment may grow and/or shrink in size during runtime operation of system 200, as discussed above with respect to FIG. 1. Free space 224 in FIG. 2 may represent memory space in storage volume 220 that is not allocated to any SVC, and may grow and/or shrink in size during runtime operation of system 200 as global free space of storage volume 220 is allocated to SVCs 202a-c and/or unreferenced memory addresses are returned to global free space, as discussed below.

SVC 202a may include free space identification module 204a, volatile memory 206a, reallocation module 208a, and free space tracking module 210a. SVC 202b may include free space identification module 204b, volatile memory 206b, reallocation module 208b, and free space tracking module 210b. SVC 202c may include free space identification module 204c, volatile memory 206c, reallocation module 208c, and free space tracking module 210c. Free space identification modules 204a-c of FIG. 2 may be analogous to (e.g., have functions and/or components similar to) free space identification modules 104a-c, respectively, of FIG. 1. Volatile memories 206a-c of FIG. 2 may be analogous to volatile memories 106a-c, respectively, of FIG. 1. Reallocation modules 208a-c of FIG. 2 may be analogous to reallocation modules 108a-c, respectively, of FIG. 1. A module may include a set of instructions encoded on a machine-readable storage medium and executable by a processor. In addition or as an alternative, a module may include a hardware device comprising electronic circuitry for implementing the functionality described below.

In some implementations, each of reallocation modules 208a-c may write data to identified unreferenced memory addresses and delete indicators from the respective volatile memory without notifying master controller 212 of the identified unreferenced memory addresses to which data is written. Thus, the unreferenced memory addresses identified by the free space identification module of a particular SVC may be known and reused by just that SVC, allowing the unreferenced memory addresses to be reused more quickly than if they were returned to global free space to be reallocated by master controller 212. In addition, the amount of global free space that SVCs request from master controller 212 may be reduced since unreferenced memory addresses may be used first to execute incoming I/O commands.

In some implementations, each of SVCs 202a, 202b, and 202c may include a free space tracking module 210a, 210b, and 210c, respectively. A free space tracking module may track a rate at which memory space in the respective segment of the storage volume is unreferenced, and track a rate at which memory space in the respective segment of the storage volume is requested by hosts. A free space tracking module may also select, in response to a determination that the rate at which memory space in the respective segment of the storage volume is unreferenced exceeds by a certain threshold the rate at which memory space in the respective segment of the storage volume is requested by hosts, a subset of identified unreferenced memory addresses to return to free space of the storage volume. A threshold may be programmed into each of free space tracking modules 210a-c. Each of free space tracking modules 210a-c may have the same threshold or different thresholds (e.g., based on workload and/or importance of processes/applications supported by the respective SVC). In some implementations, the threshold may be modified by an administrator of system 200.

In some implementations, each of reallocation modules 208a-c may notify master controller 212 of a subset of identified unreferenced memory addresses selected by the respective free space tracking module, and delete, from the respective volatile memory, indicators corresponding to the selected subset of identified unreferenced memory addresses. Thus, if there is a large discrepancy between the rate at which memory space controlled by a particular SVC is being unreferenced and the rate at which memory space is being requested by hosts via the SVC, the SVC can return some of the unreferenced memory space to global free space to be used by other SVCs. A free space tracking module may select less than all of the identified unreferenced memory addresses to return to global free space so that incoming I/O commands can be executed without the respective SVC having to request global free space from master controller 212.

In some implementations, each of free space tracking modules 210a-c may calculate how much total memory space is represented by all indicators, of the identified unreferenced memory addresses, stored in the respective volatile memory. Each of free space tracking modules 210a-c may select, in response to a determination that the calculated total memory space exceeds a free memory space threshold, a subset of the respective identified unreferenced memory addresses to return to free space 224 of storage volume 220. A free memory space threshold may be programmed into each of free space tracking modules 210a-c. Each of free space tracking modules 210a-c may have the same free memory space threshold or different free memory space thresholds (e.g., based on workload and/or importance of processes/applications supported by the respective SVC). In some implementations, a free memory space threshold may be modified by an administrator of system 200.

Each of reallocation modules 208a-c may notify master controller 212 of the respective selected subset of identified unreferenced memory addresses, the selected subset representing less than the calculated total memory space. Each of reallocation modules 208a-c may delete, from the respective volatile memory, indicators corresponding to the selected subset of identified unreferenced memory addresses. Master controller 212 may reallocate selected subsets of identified unreferenced memory addresses to respective segments of storage volume 220 controlled by other SVCs. Thus, if a large amount of unreferenced memory space controlled by a particular SVC has accumulated due to deduplication, the SVC can return some of the unreferenced memory space to global free space to be used by other SVCs. A free space tracking module may select less than all of the identified unreferenced memory addresses to return to global free space so that incoming I/O commands can be executed without the respective SVC having to request global free space from master controller 212.

Figure 3:
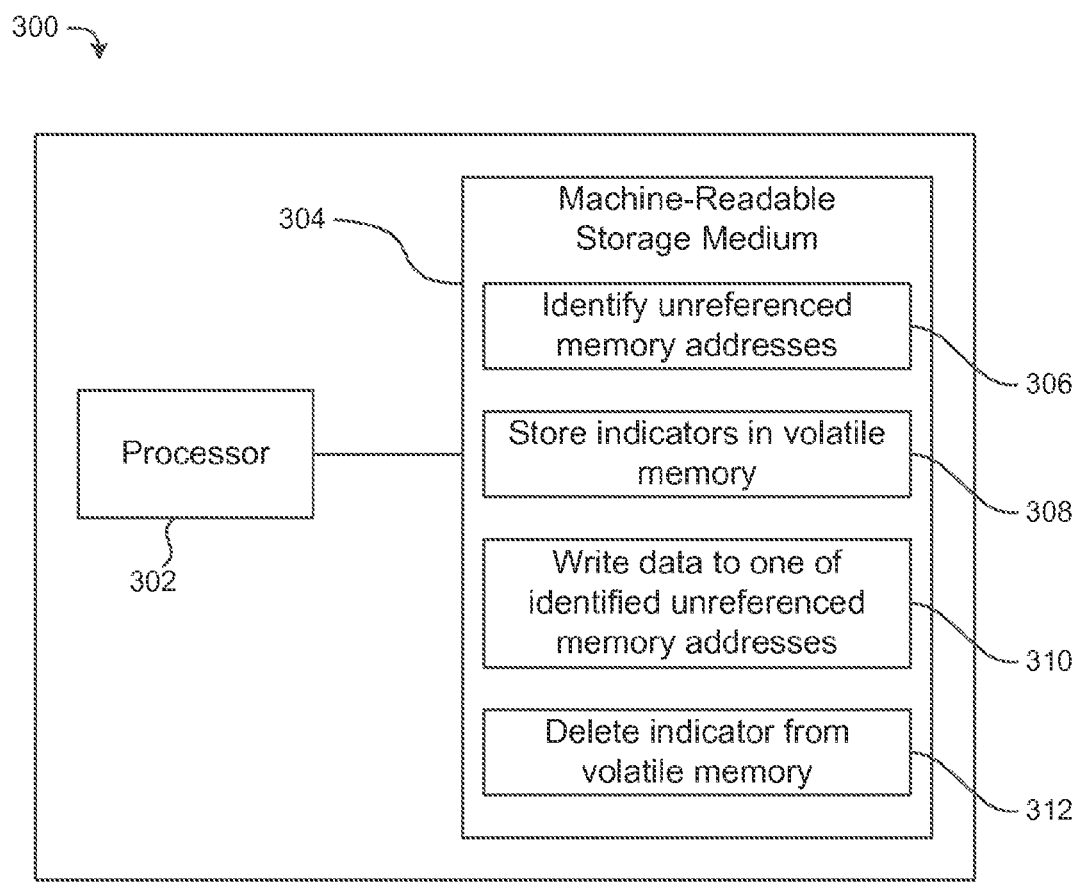
FIG. 3 is a block diagram of an example device that includes a non-transitory machine-readable storage medium encoded with instructions to enable storing of indicators of unreferenced memory addresses in volatile memory.

FIG. 3 is a block diagram of an example device 300 that includes a non-transitory machine-readable storage medium encoded with instructions to enable storing of indicators of unreferenced memory addresses in volatile memory. In some examples, device 300 may implement an SVC, such as one of SVCs 102a-c of FIG. 1 or SVCs 202a-c of FIG. 2. In FIG. 3, device 300 includes processor 302 and machine-readable storage medium 304.

Processor 302 may include a central processing unit (CPU), microprocessor (e.g., semiconductor-based microprocessor), and/or other hardware device suitable for retrieval and/or execution of instructions stored in machine-readable storage medium 304. Processor 302 may fetch, decode, and/or execute instructions 306, 308, 310, and 312 to enable storing of indicators of unreferenced memory addresses in volatile memory, as described below. As an alternative or in addition to retrieving and/or executing instructions, processor 302 may include an electronic circuit comprising a number of electronic components for performing the functionality of instructions 306, 308, 310, and/or 312.

Machine-readable storage medium 304 may be any suitable electronic, magnetic, optical, or other physical storage device that contains or stores executable instructions. Thus, machine-readable storage medium 304 may include, for example, a RAM, an Electrically Erasable Programmable Read-Only Memory (EEPROM), a storage device, an optical disc, and the like. In some implementations, machine-readable storage medium 304 may include a non-transitory storage medium, where the term "non-transitory" does not encompass transitory propagating signals. As described in detail below, machine-readable storage medium 304 may be encoded with a set of executable instructions 306, 308, 310, and 312.

Instructions 306 may identify unreferenced memory addresses in a segment of a storage volume. Access to the segment of the storage volume may be controlled by one of a plurality of SVCs. The plurality of SVCs may control access to respective segments of the storage volume. In some examples, instructions 306 may implement a free space identification module, such as free space identification modules 104a-c of FIG. 1 or free space identification modules 204a-c.

Instructions 308 may store indicators of the identified unreferenced memory addresses in a volatile memory in the one of the plurality of SVCs. The volatile memory (e.g., volatile memories 106a-c of FIG. 1 or volatile memories 206a-c of FIG. 2) may be a RAM. In some implementations, instructions 308 may store, in a volatile memory, physical and/or virtual addresses, or fragments of such addresses, corresponding to unreferenced memory addresses. In some implementations, instructions 308 may store, in a volatile memory, pointers to unreferenced memory addresses.

Instructions 310 may write, in response to an I/O command from a host, data to one of the identified unreferenced memory addresses corresponding to one of the indicators stored in the volatile memory. Instructions 312 may delete an indicator from the volatile memory. For example, instructions 312 may delete, after the data has been written, the one of the indicators from the volatile memory. The one of the identified unreferenced memory addresses may not have been made available to other SVCs after being identified, as discussed above with respect to FIG. 1. In some examples, instructions 310 and 312 may implement a reallocation module, such as reallocation modules 108a-c of FIG. 1 or reallocation modules 208a-c of FIG. 2.

Figure 4:
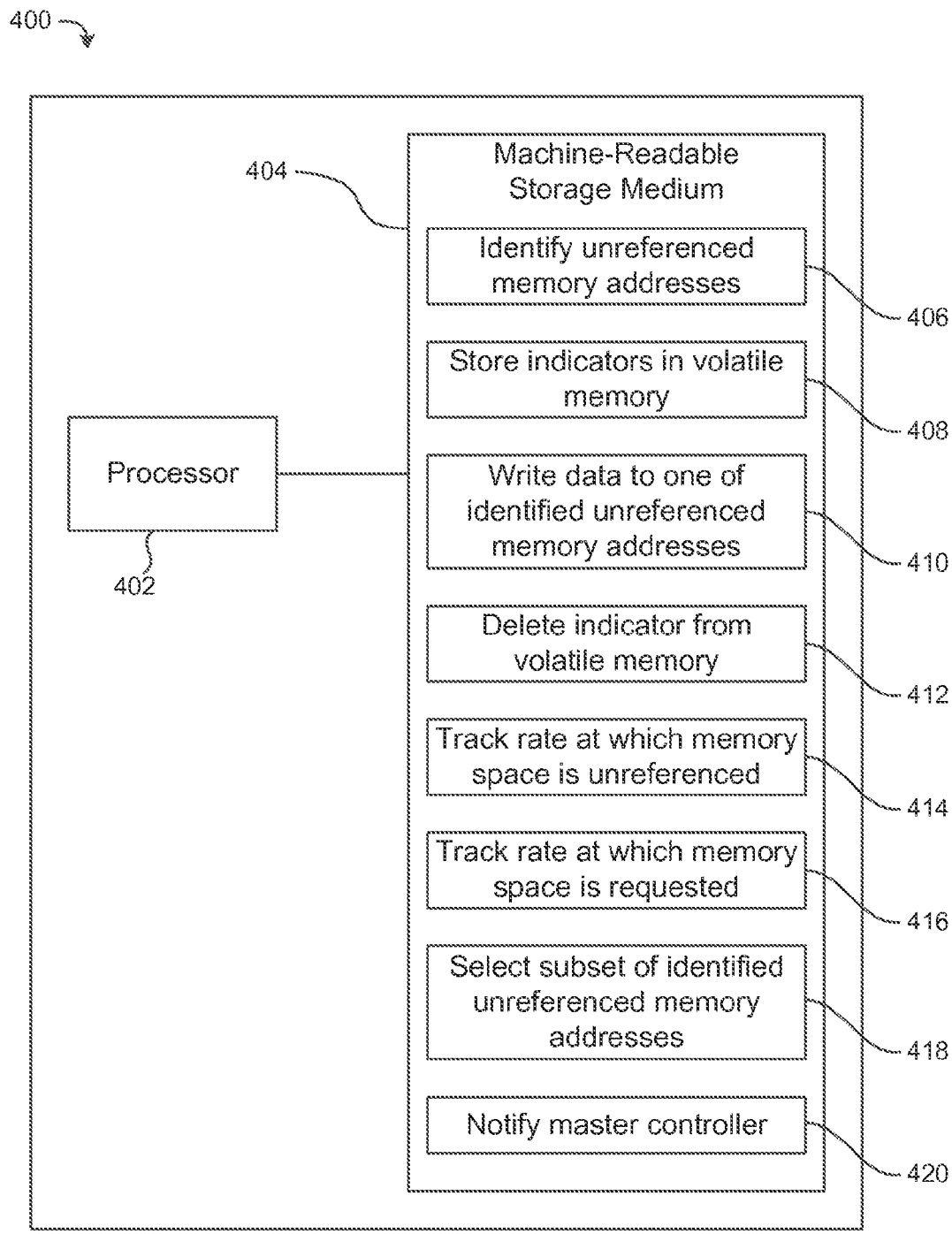
FIG. 4 is a block diagram of an example device that includes a non-transitory machine-readable storage medium encoded with instructions to enable reallocation of unreferenced memory addresses by a master controller.

FIG. 4 is a block diagram of an example device 400 that includes a non-transitory machine-readable storage medium encoded with instructions to enable reallocation of unreferenced memory addresses by a master controller. In some examples, device 400 may implement an SVC, such as one of SVCS 102a-c of FIG. 1 or SVCs 202a-c of FIG. 2. In FIG. 4, device 400 includes processor 402 and machine-readable storage medium 404.

As with processor 302 of FIG. 3, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, 410, 412, 414, 416, 418, and 420 to enable reallocation of unreferenced memory addresses by a master controller, as described below. As an alternative or in addition to retrieving and/or executing instructions, processor 402 may include an electronic circuit comprising a number of electronic components for performing the functionality of instructions 406, 408, 410, 412, 414, 416, 418, and/or 420.

As with machine-readable storage medium 304 of FIG. 3, machine-readable storage medium 404 may be any suitable physical storage device that stores executable instructions. Instructions 406, 408, 410, and 412 on machine-readable medium 404 may be analogous to instructions 306, 308, 310, and 312, respectively, on machine-readable storage medium 304. Instructions 414 may track a rate at which memory space in a segment of a storage volume is unreferenced. Access to the segment of the storage volume may be controlled by one of a plurality of SVCs. Instructions 416 may track a rate at which memory space in the segment of the storage volume is requested by hosts.

Instructions 418 may select, in response to a determination that the rate at which memory space in the segment of the storage volume is unreferenced exceeds by a certain threshold the rate at which memory space in the segment of the storage volume is requested by hosts, a subset of identified unreferenced memory addresses to return to free space of the storage volume. In some examples, instructions 414, 416, and 418 may implement a free space tracking module, such as free space tracking modules 210a-c.

Instructions 420 may notify a master controller of the selected subset of identified unreferenced memory addresses. The master controller (e.g., master controller 212 of FIG. 2) may allocate free space of the storage volume to respective ones of the plurality of SVCs. Instructions 412 may delete, from a volatile memory, indicators corresponding to the selected subset of identified unreferenced memory addresses. The master controller may reallocate the selected subset of identified unreferenced memory addresses to respective segments of the storage volume controlled by other SVCs, as discussed above with respect to FIG. 2. In some examples, instructions 412 and 420 may implement a reallocation module, such as reallocation modules 108a-c of FIG. 1 or reallocation modules 208a-c of FIG. 2.

Figure 5:
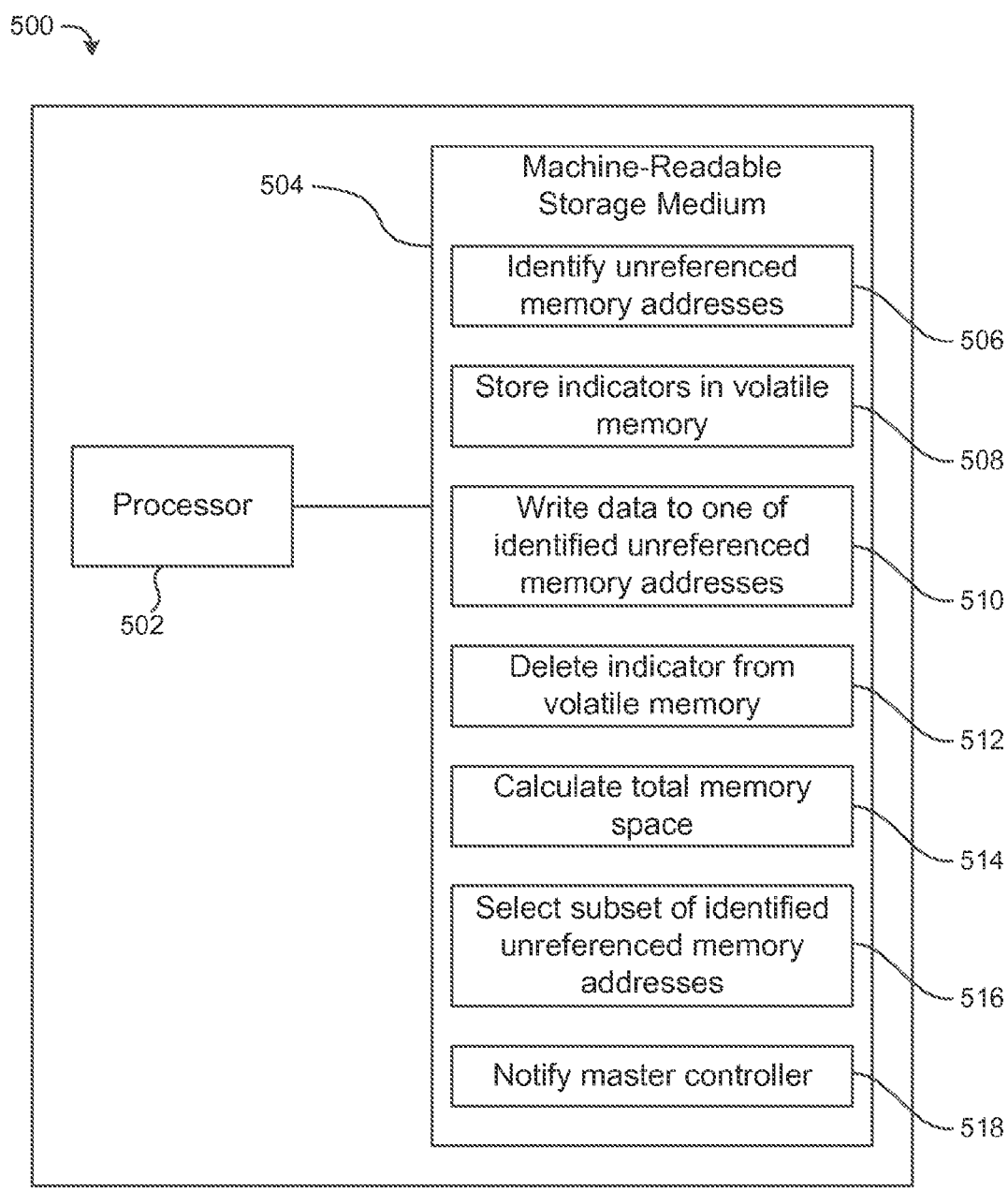
FIG. 5 is a block diagram of an example device that includes a non-transitory machine-readable storage medium encoded with instructions to enable selection, based on total memory space represented by stored indicators, of unreferenced memory addresses for reallocation by a master controller.

FIG. 5 is a block diagram of an example device 500 that includes a non-transitory machine-readable storage medium encoded with instructions to enable selection, based on total memory space represented by stored indicators, of unreferenced memory addresses for reallocation by a master controller. In some examples, device 500 may implement an SVC, such as one of SVCs 102a-c of FIG. 1 or SVCs 202a-c of FIG. 2. In FIG. 5, device 500 includes processor 502 and machine-readable storage medium 504.

As with processor 302 of FIG. 3, processor 502 may include a CPU, microprocessor (e.g., semiconductor-based microprocessor), and/or other hardware device suitable for retrieval and/or execution of instructions stored in machine-readable storage medium 504. Processor 502 may fetch, decode, and/or execute instructions 506, 508, 510, 512, 514, 516, and 518 to enable selection, based on total memory space represented by stored indicators, of unreferenced memory addresses for reallocation by a master controller, as described below. As an alternative or in addition to retrieving and/or executing instructions, processor 502 may include an electronic circuit comprising a number of electronic components for performing the functionality of instructions 506, 508, 510, 512, 514, 516, and/or 518.

As with machine-readable storage medium 304 of FIG. 3, machine-readable storage medium 504 may be any suitable physical storage device that stores executable instructions. Instructions 506, 508, 510, and 512 on machine-readable storage medium 504 may be analogous to instructions 306, 308, 310, and 312, respectively, on machine-readable storage medium 304. Instructions 506 may identify unreferenced memory addresses in a segment of a storage volume, access to the segment of the storage volume being controlled by one of a plurality of SVCs. Instructions 514 may calculate how much total memory space is represented by all indicators, of the identified unreferenced memory addresses, stored in a volatile memory. Instructions 516 may select, in response to a determination that the calculated total memory space exceeds a free memory space threshold, a subset of identified unreferenced memory addresses to return to free space of the storage volume. In some examples, instructions 514 and 516 may implement a free space tracking module, such as free space tracking modules 210a-c.

Instructions 518 may notify a master controller of the selected subset of identified unreferenced memory addresses. The selected subset may represent less than the calculated total memory space. Instructions 512 may delete, from the volatile memory, indicators corresponding to the selected subset of identified unreferenced memory addresses. The master controller (e.g., master controller 212) may reallocate the selected subset of identified unreferenced memory addresses to respective segments of the storage volume controlled by other SVCs, as discussed above with respect to FIG. 2. In some examples, instructions 512 and 518 may implement a reallocation module, such as reallocation modules 108a-c of FIG. 1 or reallocation modules 208a-c of FIG. 2.

Figure 6:
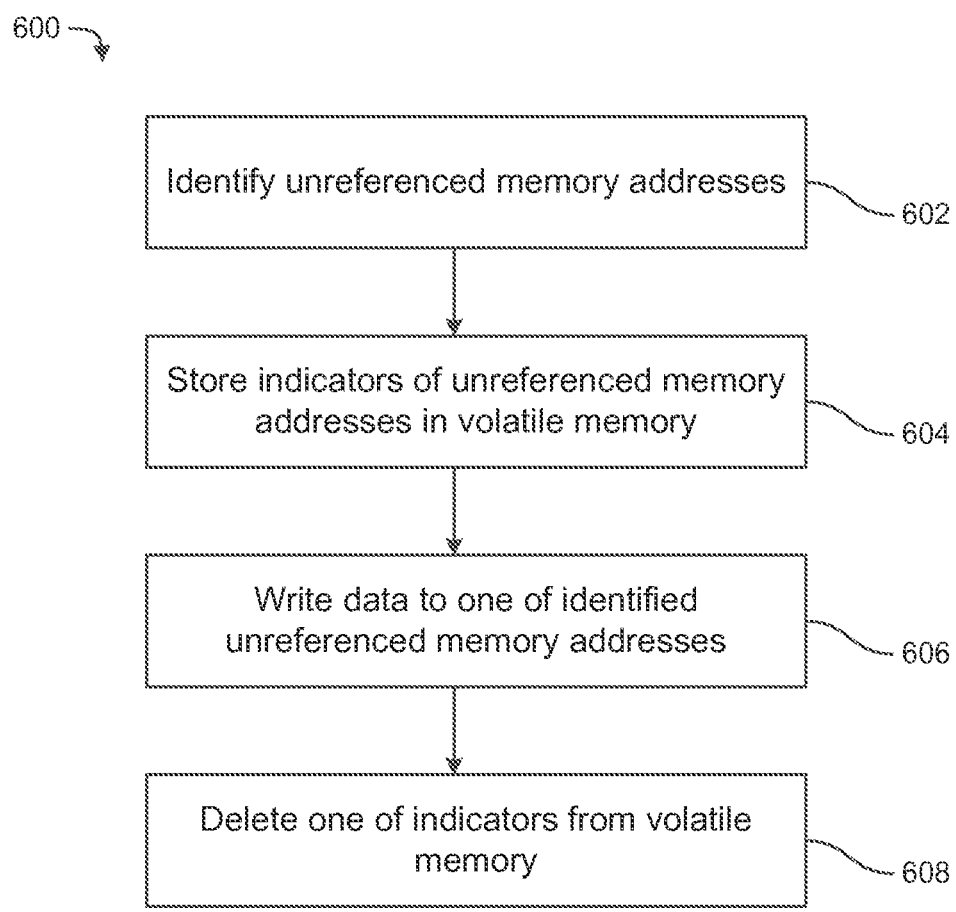
FIG. 6 is a flowchart of an example method for storing indicators of unreferenced memory addresses in volatile memory.
Figure 7:
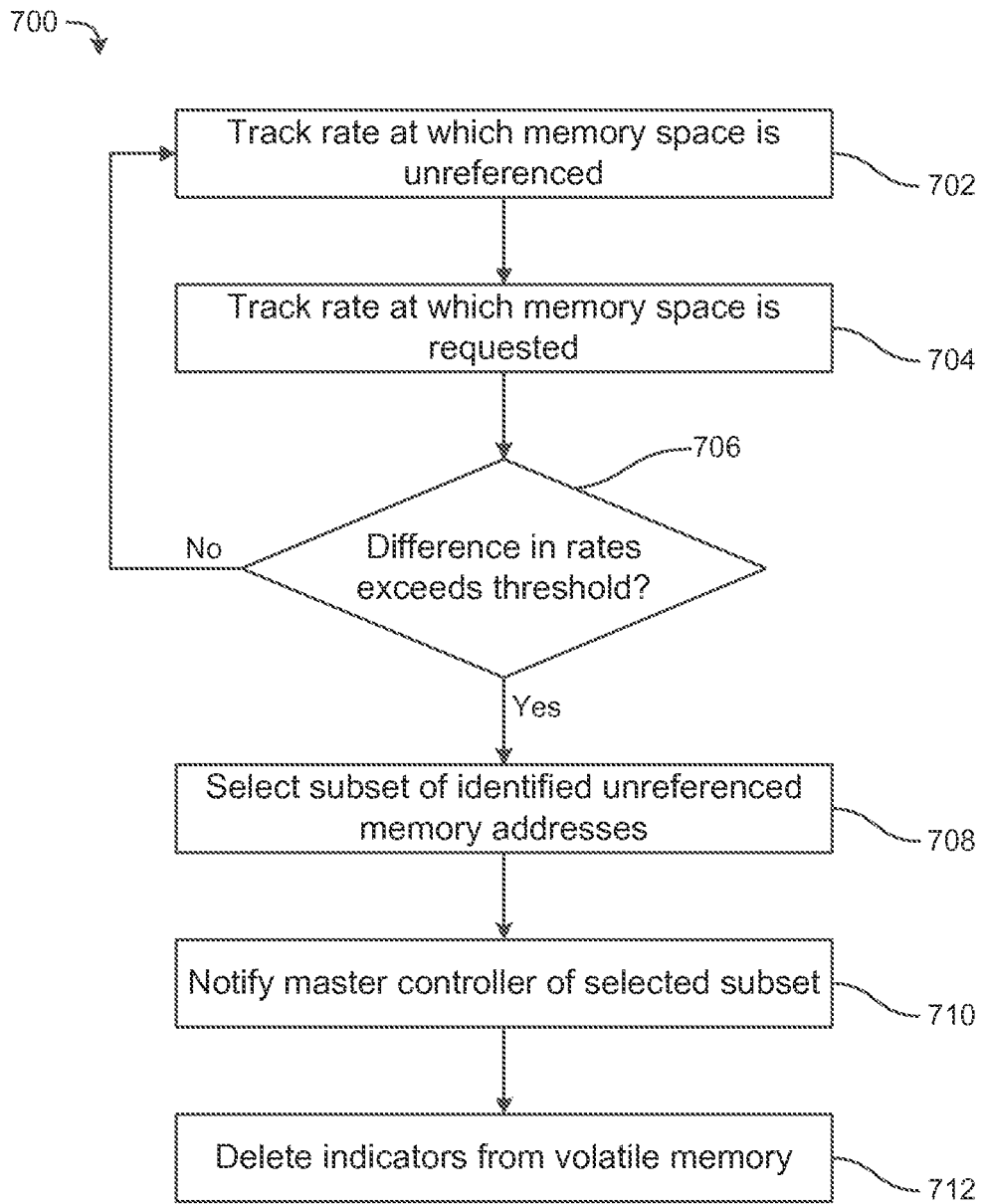
FIG. 7 is a flowchart of an example method for returning unreferenced memory addresses to a master controller.
Figure 8:
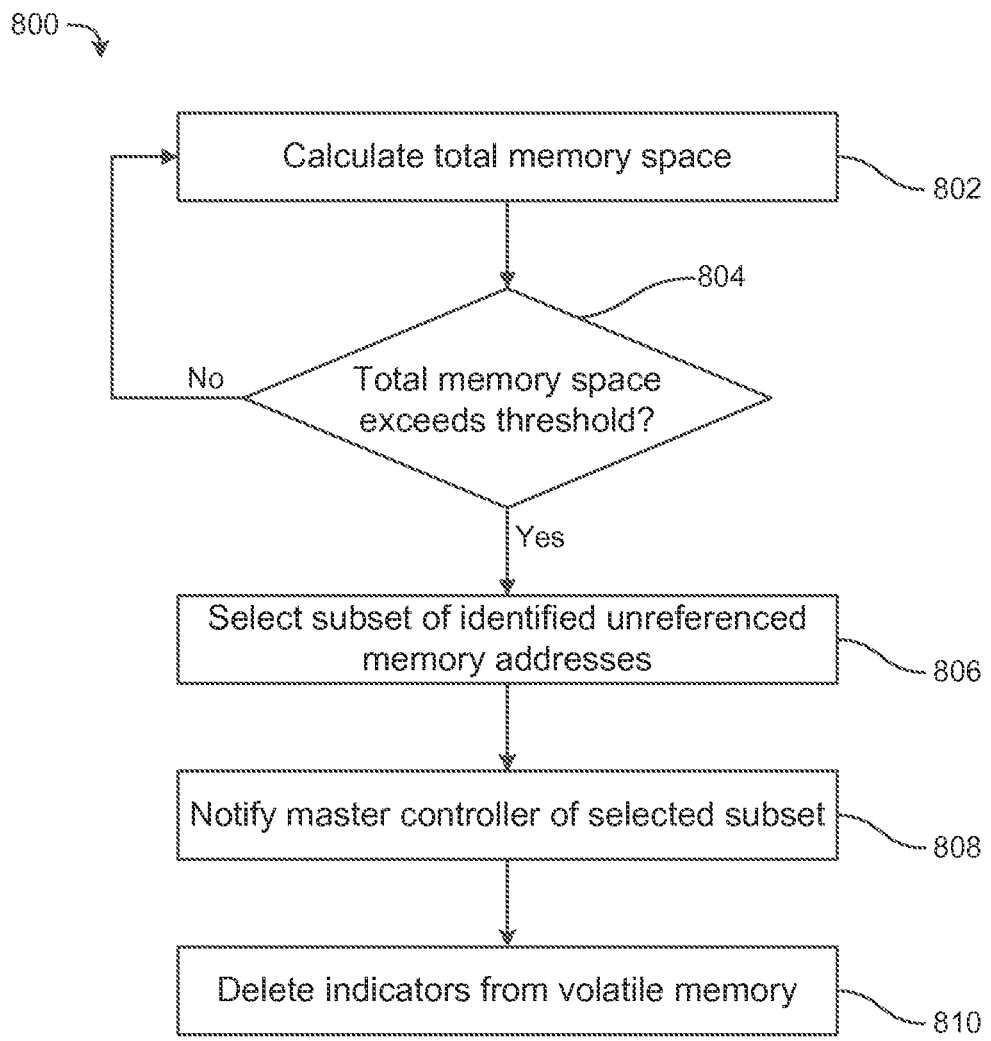
FIG. 8 is a flowchart of an example method for returning unreferenced memory addresses to a master controller.

Methods related to tracking unreferenced memory addresses are discussed with respect to FIGS. 6-8. FIG. 6 is a flowchart of an example method 600 for storing indicators of unreferenced memory addresses in volatile memory. Although execution of method 600 is described below with reference to processor 302 of FIG. 3, it should be understood that execution of method 600 may be performed by other suitable devices, such as processors 402 and 502 of FIGS. 4 and 5, respectively. Method 60( )may be implemented in the form of executable instructions stored on a machine-readable storage medium and/or in the form of electronic circuitry.

Method 600 may start in block 602, where processor 302 may identify unreferenced memory addresses in a segment of a storage volume. Access to the segment of the storage volume may be controlled by one of a plurality of SVCs. The plurality of SVCs may control access to respective segments of the storage volume.

Next, in block 604, processor 302 may store indicators of the identified unreferenced memory addresses in a volatile memory in the one of the plurality of SVCs. The volatile memory (e.g., volatile memories 106a-c of FIG. 1 or volatile memories 206a-c of FIG. 2) may he a RAM. In some implementations, processor 302 may store, in the volatile memory, physical and/or virtual addresses, or fragments of such addresses, corresponding to unreferenced memory addresses. In some implementations, processor 302 may store, in the volatile memory, pointers to unreferenced memory addresses.

In block 606, processor 302 may write, in response to an I/O command from a host, data to one of the identified unreferenced memory addresses corresponding to one of the indicators stored in the volatile memory. In block 608, processor 302 may delete, after the data has been written, the one of the indicators from the volatile memory. The one of the identified unreferenced memory addresses may not have been made available to other SVCs after being identified, as discussed above with respect to FIG. 1.

FIG. 7 is a flowchart of an example method 700 for returning unreferenced memory addresses to a master controller. Although execution of method 700 is described below with reference to processor 402 of FIG. 4, it should be understood that execution of method 700 may be performed by other suitable devices, such as processors 302 and 502 of FIGS. 3 and 5, respectively. Some blocks of method 700 may be performed in parallel with and/or after method 600. Method 700 may be implemented in the form of executable instructions stored on a machine-readable storage medium and/or in the form of electronic circuitry.

Method 700 may start in block 702, where processor 402 may track a rate at which memory space in a segment of a storage volume is unreferenced. Access to the segment of the storage volume may be controlled by one of a plurality of SVCs. In block 704, processor 402 may track a rate at which memory space in the segment of the storage volume is requested by hosts. Although block 704 is shown below block 702 in FIG. 7, it should be understood that the elements of block 704 may be performed before or in parallel with the elements of block 702.

In block 706, processor 402 may determine whether the rate at which memory space in the segment of the storage volume is unreferenced exceeds by a certain threshold the rate at which memory space in the segment of the storage volume is requested by hosts. If not, method 700 may loop back to block 702. If, in block 706, processor 402 determines that the rate at which memory space in the segment of the storage volume is unreferenced exceeds by a certain threshold the rate at which memory space in the segment of the storage volume is requested by hosts, method 700 may proceed to block 708, in which processor 402 may select a subset of identified unreferenced memory addresses to return to free space of the storage volume.

In block 710, processor 402 may notify a master controller of the selected subset of identified unreferenced memory addresses. The master controller (e.g., master controller 212) may allocate free space of the storage volume to respective ones of the plurality of SVCS.

In block 712, processor 402 may delete, from a volatile memory, indicators corresponding to the selected subset of identified unreferenced memory addresses. The master controller may reallocate the selected subset of identified unreferenced memory addresses to respective segments of the storage volume controlled by other SVCs, as discussed above with respect to FIG. 2.

FIG. 8 is a flowchart of an example method 800 for returning unreferenced memory addresses to a master controller. Although execution of method 800 is described below with reference to processor 502 of FIG. 5, it should be understood that execution of method 800 may be performed by other suitable devices, such as processors 302 and 402 of FIGS. 3 and 4, respectively. Some blocks of method 800 may be performed in parallel with and/or after method 600 or 700. Method 800 may be implemented in the form of executable instructions stored on a machine-readable storage medium and/or in the form of electronic circuitry.

Method 800 may start in block 802, where processor 502 may calculate how much total memory space is represented by all indicators, of identified unreferenced memory addresses, stored in a volatile memory. The volatile memory may be in one of a plurality of SVCs, each of the plurality of SVCs controlling access to a respective segment of a storage volume.

In block 804, processor 502 may determine whether the calculated total memory space exceeds a free memory space threshold. If not, method 800 may loop back to block 802. If, in block 804, processor 502 determines that the calculated total memory space exceeds the free memory space threshold, method 800 may proceed to block 806, in which processor 502 may select a subset of identified unreferenced memory addresses to return to free space of the storage volume. The selected subset may represent less than the calculated total memory space, as discussed above with respect to FIG. 2.

In block 808, processor 502 may notify a master controller of the selected subset of identified unreferenced memory addresses. In block 810, processor 502 may, delete, from the volatile memory, indicators corresponding to the selected subset of identified unreferenced memory addresses. The master controller (e.g., master controller 212) may reallocate the selected subset of identified unreferenced memory addresses to respective segments of the storage volume controlled by other SVCs.

The foregoing disclosure describes tracking unreferenced memory addresses in a volatile memory of an SVC. Example implementations described herein enable unreferenced memory addresses to be reused without incurring high processing costs, and enable conservation of global free space.

We claim:

1. A system comprising:
   a storage volume; and
   a plurality of storage volume controllers (SVCs) communicatively coupled to one another and to the storage volume, wherein each SVC controls access to a respective segment of the storage volume, and wherein each SVC comprises:
   a free space identification module to identify unreferenced memory addresses in the respective segment of the storage volume;
   a volatile memory to store indicators of the identified unreferenced memory addresses; and
   a reallocation module to:
   write, in response to an input/output (I/O) command from a host, data to one of the identified unreferenced memory addresses corresponding to one of the indicators stored in the volatile memory; and
   delete, after the data has been written, the one of the indicators from the volatile memory, wherein the one of the identified unreferenced memory addresses was not made available to other SVCs after being identified.

2. The system of claim 1, further comprising a master controller communicatively coupled to the plurality of SVCs and to the storage volume, wherein:
   the master controller is to allocate free space of the storage volume to respective ones of the plurality of SVCs; and
   each reallocation module in the plurality of SVCs is further to write data to identified unreferenced memory addresses and delete indicators from the respective volatile memory without notifying the master controller of the identified unreferenced memory addresses to which data is written.

3. The system of claim 2, wherein each SVC further comprises a free space tracking module to:
   track a rate at which memory space in the respective segment of the storage volume is unreferenced;
   track a rate at which memory space in the respective segment of the storage volume is requested by hosts; and
   select, in response to a determination that the rate at which memory space in the respective segment of the storage volume is unreferenced exceeds by a certain threshold the rate at which memory space in the respective segment of the storage volume is requested by hosts, a subset of identified unreferenced memory addresses to return to free space of the storage volume.

4. The system of claim 3, wherein:
   the reallocation module of each SVC is further to:
   notify the master controller of the selected subset of identified unreferenced memory addresses; and
   delete, from the respective volatile memory, indicators corresponding to the selected subset of identified unreferenced memory addresses; and
   the master controller is to reallocate the selected subset of identified unreferenced memory addresses to respective segments of the storage volume controlled by other SVCs.

5. The system of claim 2, wherein each SVC further comprises a free space tracking module to:
   calculate how much total memory space is represented by all indicators, of the identified unreferenced memory addresses, stored in the respective volatile memory; and
   select, in response to a determination that the calculated total memory space exceeds a free memory space threshold, a subset of identified unreferenced memory addresses to return to free space of the storage volume.

6. The system of claim 5, wherein:
   the reallocation module of each SVC is further to:
   notify the master controller of the selected subset of identified unreferenced memory addresses, wherein the selected subset represents less than the calculated total memory space; and
   delete, from the respective volatile memory, indicators corresponding to the selected subset of identified unreferenced memory addresses; and
   the master controller is to reallocate the selected subset of identified unreferenced memory addresses to respective segments of the storage volume controlled by other SVCs.

7. A non-transitory machine-readable storage medium encoded with instructions executable by a processor, the machine-readable storage medium comprising:
   instructions to identify unreferenced memory addresses in a segment of a storage volume, access to the segment of the storage volume being controlled by one of a plurality of storage volume controllers (SVCs), wherein the plurality of SVCs control access to respective segments of the storage volume;
   instructions to store indicators of the identified unreferenced memory addresses in a volatile memory in the one of the plurality of SVCs;
   instructions to write, in response to an input/output (I/O) command from a host, data to one of the identified unreferenced memory addresses corresponding to one of the indicators stored in the volatile memory; and
   instructions to delete, after the data has been written, the one of the indicators from the volatile memory, wherein the one of the identified unreferenced memory addresses was not made available to other SVCs after being identified.

8. The non-transitory machine-readable storage medium of claim 7, further comprising:
   instructions to track a rate at which memory space in the segment of the storage volume is unreferenced;
   instructions to track a rate at which memory space in the segment of the storage volume is requested by hosts; and
   instructions to select, in response to a determination that the rate at which memory space in the segment of the storage volume is unreferenced exceeds by a certain threshold the rate at which memory space in the segment of the storage volume is requested by hosts, a subset of identified unreferenced memory addresses to return to free space of the storage volume.

9. The non-transitory machine-readable storage medium of claim 8, further comprising:
   instructions to notify a master controller of the selected subset of identified unreferenced memory addresses, wherein the master controller is to allocate free space of the storage volume to respective ones of the plurality of SVCs; and instructions to delete, from the volatile memory, indicators corresponding to the selected subset of identified unreferenced memory addresses;

wherein the master controller is to reallocate the selected subset of identified unreferenced memory addresses to respective segments of the storage volume controlled by other SVCs.

10. The non-transitory machine-readable storage medium of claim 7, further comprising:

instructions to calculate how much total memory space is represented by all indicators, of the identified unreferenced memory addresses, stored in the volatile memory; and instructions to select, in response to a determination that the calculated total memory space exceeds a free memory space threshold, a subset of identified unreferenced memory addresses to return to free space of the storage volume.

11. The non-transitory machine-readable storage medium of claim 10, further comprising;

instructions to notify a master controller of the selected subset of identified unreferenced memory addresses, wherein the selected subset represents less than the calculated total memory space; and instructions to delete, from the volatile memory, indicators corresponding to the selected subset of identified unreferenced memory addresses;

wherein the master controller is to reallocate the selected subset of identified unreferenced memory addresses to respective segments of the storage volume controlled by other SVCs.

12. A method comprising:

identifying unreferenced memory addresses in a segment of a storage volume, access to the segment of the storage volume being controlled by one of a plurality of storage volume controllers (SVCs), wherein the plurality of SVCs control access to respective segments of the storage volume;

storing indicators of the identified unreferenced memory addresses in a volatile memory in the one of the plurality of SVCs;

writing, in response to an input/output (I/O) command from a host, data to one of the identified unreferenced memory addresses corresponding to one of the indicators stored in the volatile memory; and deleting, after the data has been written, the one of the indicators from the volatile memory, wherein the one of the identified unreferenced memory addresses was not made available to other SVCs after being identified.

13. The method of claim 12, further comprising:

tracking a rate at which memory space in the segment of the storage volume is unreferenced;

tracking a rate at which memory space in the segment of the storage volume is requested by hosts; and selecting, in response to a determination that the rate at which memory space in the segment of the storage volume is unreferenced exceeds by a certain threshold the rate at which memory space in the segment of the storage volume is requested by hosts, a subset of identified unreferenced memory addresses to return to free space of the storage volume.

14. The method of claim 13, further comprising:

notifying a master controller of the selected subset of identified unreferenced memory addresses, wherein the master controller is to allocate free space of the storage volume to respective ones of the plurality of SVCs; and deleting, from the volatile memory, indicators corresponding to the selected subset of identified unreferenced memory addresses;

wherein the master controller is to reallocate the selected subset of identified unreferenced memory addresses to respective segments of the storage volume controlled by other SVCs.

15. The method of claim 12, further comprising:

calculating how much total memory space is represented by all indicators, of the identified unreferenced memory addresses, stored in the volatile memory;

selecting, in response to a determination that the calculated total memory space exceeds a free memory space threshold, a subset of identified unreferenced memory addresses to return to free space of the storage volume, wherein the selected subset represents less than the calculated total memory space;

notifying a master controller of the selected subset of identified unreferenced memory addresses; and deleting, from the volatile memory, indicators corresponding to the selected subset of identified unreferenced memory addresses;

wherein the master controller is to reallocate the selected subset of identified unreferenced memory addresses to respective segments of the storage volume controlled by other SVCs.

* * * * *